United States Patent
Donais et al.

(10) Patent No.: US 10,628,914 B1
(45) Date of Patent: Apr. 21, 2020

(54) DISTRIBUTED IMAGE PROCESSING AND MANIPULATION

(71) Applicant: Capital One Services, LLC, McLean, VA (US)

(72) Inventors: Jordan Donais, Little Elm, TX (US); Venkata Sudha Reddennagari, Frisco, TX (US); Devi Kiran Gonuguntla, Flower Mound, TX (US); Jack Farrington, Lewisville, TX (US); Suresh Navayamkunnil Raghavan, McKinney, TX (US); Rajani Kumar Reddy Naini, Frisco, TX (US); Grace Kaldawi, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/557,252

(22) Filed: Aug. 30, 2019

Related U.S. Application Data

(63) Continuation of application No. 16/264,341, filed on Jan. 31, 2019, now Pat. No. 10,438,315.

(51) Int. Cl.
  *G06T 1/20* (2006.01)
  *G06T 7/70* (2017.01)
  *G06K 9/00* (2006.01)
  *G06T 3/40* (2006.01)
  *H04L 29/08* (2006.01)

(52) U.S. Cl.
  CPC ............ *G06T 1/20* (2013.01); *G06K 9/00624* (2013.01); *G06T 3/40* (2013.01); *G06T 7/70* (2017.01); *G06K 2209/01* (2013.01); *G06T 2207/20024* (2013.01); *H04L 67/02* (2013.01)

(58) Field of Classification Search
  None
  See application file for complete search history.

(56) References Cited

U.S. PATENT DOCUMENTS

| | | | |
|---|---|---|---|
| 10,169,121 B2 * | 1/2019 | Vibhor | G06Q 10/06 |
| 10,347,293 B1 * | 7/2019 | Skinner | G11B 27/031 |
| 2012/0075648 A1 * | 3/2012 | Keys | G06K 9/00979 358/1.11 |
| 2012/0117570 A1 * | 5/2012 | Ozaki | G06Q 10/06 718/102 |

(Continued)

OTHER PUBLICATIONS

Matsudaira K., "Scalable Web Architecture and Distributed Systems," The Architechture of Open Source Applications (vol. 2): (Year: 2012).

(Continued)

*Primary Examiner* — Randolph I Chu
(74) *Attorney, Agent, or Firm* — Hunton Andrews Kurth LLP

(57) ABSTRACT

This disclosure pertains to a dynamic pipeline for processing images. The pipeline can receive inventory data or records from an upstream process. These records can include one or more URLs for images relating to a product listing or any other listing. An orchestration layer of the pipeline can carry these records through a series of processes or steps. Each step can be performed by a cluster in the pipeline. Individual task workers in each cluster can pick up each record, perform the task assigned to the cluster, and pass the record to the next step.

20 Claims, 3 Drawing Sheets

(56) References Cited

U.S. PATENT DOCUMENTS

| | | | |
|---|---|---|---|
| 2013/0106685 A1* | 5/2013 | Davis | G06F 16/00 |
| | | | 345/156 |
| 2016/0048849 A1* | 2/2016 | Shiftan | G06Q 30/0241 |
| | | | 705/7.29 |
| 2017/0180567 A1* | 6/2017 | Sharma | H04M 15/00 |
| 2018/0061033 A1* | 3/2018 | Bastide | G06T 7/0002 |
| 2018/0091773 A1* | 3/2018 | Moussa | G06T 1/20 |
| 2018/0157592 A1* | 6/2018 | Ivanov | G06F 8/60 |
| 2018/0157681 A1* | 6/2018 | Yang | G06F 16/583 |
| 2018/0285682 A1* | 10/2018 | Najibi | G06K 9/00664 |
| 2019/0020909 A1* | 1/2019 | Petajan | G11B 27/34 |
| 2019/0109903 A1* | 4/2019 | Klose | H04L 67/1097 |
| 2019/0303164 A1* | 10/2019 | King | G06F 9/4881 |

OTHER PUBLICATIONS

Setting up a Simple OCR Server, "https://web.achive.org/web/20180730083631/https://realpython.com/setting-up-a-simple-ocr-server/" Jul. 2018 (Year: 2018).

Baggio et al., "Image Spam Filtering Using Visual Information," 14th International Conference on Image Analysis and Processing (ICIAP 2007), Oct. 2007 (Year: 2007).

\* cited by examiner

DISTRIBUTED IMAGE PROCESSING AND MANIPULATION

CROSS REFERENCE TO RELATED APPLICATION

The subject application is a Continuation of U.S. application Ser. No. 16/264,342 filed Jan. 31, 2019, the contents of which is hereby incorporated by reference in its entirety.

BACKGROUND

A pipeline can consist of a chain of processing elements (or steps) arranged so that the output of each element (or step) is the input of the next. The information that flows in a pipeline can be a stream of records, bytes or bits.

SUMMARY

This disclosure pertains to a dynamic pipeline for processing images. The pipeline can receive inventory data or records from an upstream process. These records can include one or more URLs for images relating to a product listing or any other listing. An orchestration layer of the pipeline can carry these records through a series of processes or steps. Each step can be performed by a cluster in the pipeline. Individual task workers in each cluster can pick up each record, perform the task assigned to the cluster, and pass the record to the next step.

For example, in one of the steps of the pipeline, a worker in the downloading cluster of the pipeline retrieves the images from a third-party hosting facility and downloads them into a platform associated with the pipeline, e.g., a datastore. Once the downloading task is completed, the record can be passed to the next step. In the next step, a worker of the filtering cluster of the pipeline can validate or filter the images. In this step, the worker can scan each image to ensure that the image does not include any impermissible information. Various machine learning technique can be used for this purpose. If the image is validated, the record can be passed to the next step. In the next step, a worker of the resizing cluster of the pipeline can resize or crop the images. The images can be resized to ensure optimal display within a website or other applications. The outcome of this pipeline can be a finalized set of images gathered in a datastore to be used by a website or another application. The datastore can also include metadata information about the images and the work that was done on the images.

The pipeline of this disclosure can have a distributed architecture such that it encompasses a plurality of computer clusters. Unlike many local systems, which are concentrated on a single machine, this pipeline can distribute the work among a plurality of computer clusters. As a result, the technical requirements of the systems included in each cluster can differ to match only the cluster's special needs. For example, for downloading tasks, there can be very few requirements, and a low-level machine can satisfy these requirements. Hence, the downloading cluster can include only low-level machines. On the other hand, filtering tasks can require more powerful processing and graphics units. Thus, the filtering cluster can include more powerful machines. The distributed nature of this pipeline allows efficient utilization of hardware as less powerful systems can be used in connection with less demanding clusters and more powerful systems can be used in connection with more demanding clusters.

The pipeline of this disclosure is very flexible because each cluster of the pipeline can scale into substantial size to address demand fluctuations. Unlike local systems, which have limited processing power dictated by the local hardware, the processing power of this pipeline can easily scale. In this pipeline, only the orchestration layer is aware of the order of the steps (and clusters). Otherwise, each cluster is agnostic as to any other cluster in the pipeline. The compartmentalized nature of the pipeline as well as its the distributed design make the pipeline a dynamic pipeline. Any change to the number or order of the steps included in the pipeline can easily be implemented through the orchestration layer. For example, any number of steps can be added or removed from the pipeline, and the arrangement of the steps can easily be changed though the orchestration layer. In fact, nothing in the pipeline limits the steps that can follow a given step. These flexibilities in the design of the pipeline make the pipeline particularly beneficial because changing the steps or their respective order in the pipeline would not require any changing of the clusters.

DETAILED DESCRIPTION

Orchestration Layer

Figure 1:
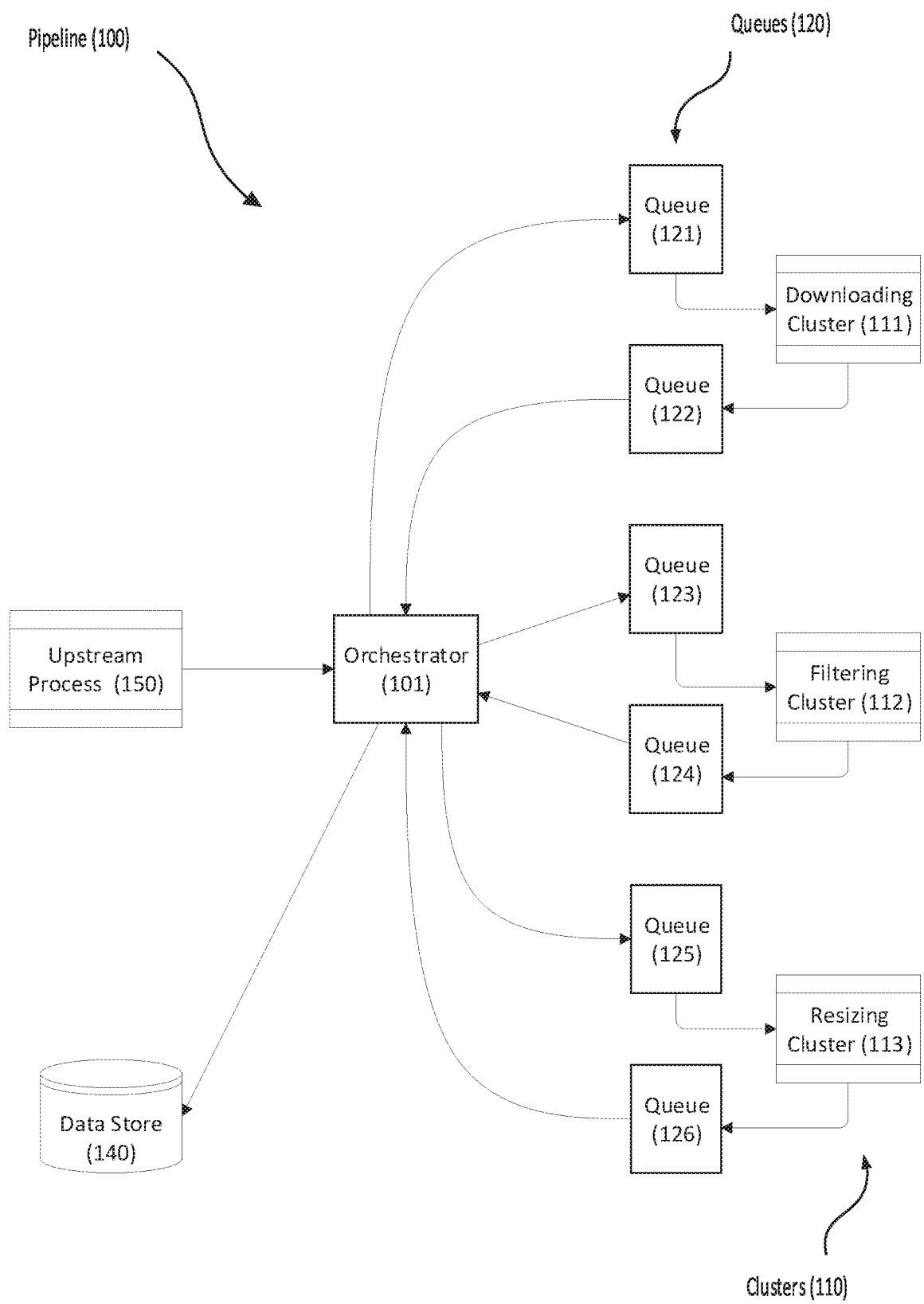
FIG. 1 shows a pipeline for processing images according to an example embodiment.

The pipeline of this disclosure can include an orchestration layer. The orchestration layer can include an orchestrator which can be a cluster in cloud, or one or more local computers or servers. The orchestration layer can manage or coordinate the steps of the pipeline disclosed in this disclosure.

For example, when the orchestration layer receives a record (or message), the layer can publish the record on a particular queue. The publication of the record on the queue can determine what task will be performed on the record or in relation to the record. A specific cluster is listening to the queue and a worker (or server) of the cluster can pick up the record and perform the task. The orchestration layer does not know which worker of the cluster picks up the record. The record is usually picked up by the first available worker, i.e., the workers perform the tasks on a first-come, first-served basis. If during the performance of the task, the cluster determines that the cluster is overwhelmed (e.g., cannot keep up with the demand), the cluster can trigger a scaling event. Once a task is completed, the worker can publish the record (or a message) to a completion queue which the orchestration layer knows about. The orchestration layer can determine what step comes next and publishes the record (or message) on a queue associated with a cluster which specializes in performance of the next task.

The orchestrator can receive a stream of records or requests from an upstream process. These records can originate from a third party, e.g., a service provider. The third party can transmit a raw feed of these records to the upstream process. The upstream process can publish these records to the orchestration layer for consumption by the orchestration layer. In an example embodiment, the upstream process can translate the format of each record into a common format understood by the downstream components, e.g., pipelines. Otherwise, the orchestration layer may be configured to understand the wide range of records the overall system accepts.

The upstream process can determine the identity of the feed provider. Additionally, the upstream process can determine the task requested by each record. For example, the upstream process can determine if the record requires a force update, a change, or no change. The upstream process may make this determination using a hash included in the record, or the upstream process could manually make this determination. This determination can provide the orchestration layer guidance on what actions it should take. In the case of an unchanged record (or a record that the upstream has processed before and requires no further action), the upstream process can skip sending the record to the orchestration layer.

In an example embodiment, one or more upstream processes can be connected to one or more pipelines. Only the upstream processes know which pipeline an incoming stream should be published to.

In an example embodiment, the orchestration layer can determine whether a new record has been (fully or partially) processed before. For example, the orchestration layer can determine whether it has seen the identification number associated with the new record. The orchestration layer can search for the identification number in the datastore. If the identification number is located in the datastore, the orchestration layer can pull the stored record from the datastore. The orchestration layer can also retrieve the hash of all the original image addresses from that prior run. The orchestration layer can compare this hash to the current run's hash. If the hash is the same then the orchestration layer knows it has already completed this record. If the hash is different, the orchestration layer can compare the individual image hashes to the individual image hashes of the new record. For the hashes that match, the orchestration layer can ignore the image, but for the ones that do not match, the orchestration layer can process them again.

In an example embodiment, images that were removed by the filter do not contribute to these hashes. Images that failed for reasons that were identified as recoverable will count towards the hashes. If a force override has been given in the record, these steps will be ignored.

The Records and Messages

A record can be a file including various information. Each record can include a unique identifier. The record can also include one or more URLs, e.g., image URLs. Some incoming records can include information which are deleted prior to being published to the pipeline. In other words, a record that is used by the pipeline can be a subset of the original record. The original record can contain information about a vehicle e.g., VIN No., make, model, trim, etc. But the record used in the pipeline may not contain this information. This information can be added back to the record after being processed by the pipeline.

In some embodiments, the datastore can include metadata relating to a record. The metadata can include the unique identifier of the record, e.g., a logical grouping of images associated with a single vehicle. The metadata can also include the hash of all the original image addresses, or the hashes of the individual addresses. The metadata can also include a field that contains the current status of the individual images, e.g., whether they have failed a step or been removed in the filtering process. The metadata can also include a timestamp field indicating when the record was first seen, when it was last seen, and when it was last modified. The metadata can also include fields indicating which provider provided the record.

The orchestration layer can access the metadata when the record initially enters the pipeline. The metadata can be updated once each step is completed, some of the steps are completed, or all the steps of the pipeline are completed. This metadata, once accessed, can become part of the message exchanged between the orchestration layer and various steps. Using the metadata, the orchestration layer can determine whether it has processed the record before, and if so, what steps were performed in connection with the record.

The orchestration layer and the workers of each step advance a record through the pipeline by publishing messages on various queues. The contents of a message can be the same as the metadata. The message can also include fields understandable by the pipeline components, e.g., downloader, filter, etc. For example, a message that a downloader publishes can include a field that contains the origination address and destination location for each image in the datastore. The clusters do not message each other, but instead the clusters know of a single message queue to read from. The clusters also know of a single message queue to publish messages to (or write messages to). The orchestrator layer knows of all the queues.

Some records can include an override instruction. The override instruction can be an instruction to the orchestration layer to repeat or skip a step in the pipeline. For example, for a record that has been at least partially processed by the orchestration layer, an override instruction in the record can instruct the orchestration layer to repeat a step (even though the step has been performed before). The record override instruction can have priority over the orchestrator policy (to be discussed below).

In some embodiments, a message published on a queue can include a list of steps or processes that have been performed on a record or in connection with the record. The message can also include a list of steps or processes that have not been performed on the record or in connection with the record, e.g., failed steps.

In some embodiments, a record can include information about an object or a listing. For example, a record can include information about a vehicle or a vehicle listing.

Intrinsic Policy for the Orchestration Layer

In an embodiment, an intrinsic policy or order can be defined for the orchestration layer. The policy can determine the logical sequence of the steps that can be performed on records, e.g., what step should be configured first and what step should be configured next. The policy can be reconfigured to add or remove steps into the pipeline (i.e., to reconfigure the pipeline). For example, by removing a step from the policy, the orchestration layer can stop publishing records to the queue associated with that step. As another example, the policy can be modified to add a new step to the pipeline and require the orchestration layer to listen to a new completion queue.

The policy can define a set of rules for records that have been partially or fully processed before (i.e., records that the orchestration layer has seen before). For example, the policy can require the orchestration layer to skip a step for a record if the layer has published the record on a queue associated with that step. As another example, the policy can require the orchestration layer to skip a step only if the task associated with the step has been successfully performed on the record.

In some embodiments, records can influence the flow of steps in the pipeline. For example, the records can override an orchestration layer's intrinsic policy. A record can specify that a step of the pipeline can be skipped for the record. In this case, the orchestrator can override the intrinsic policy and skip the step. As another example, if the orchestration layer receives a record from upstream, and it notices that the record has been processed before and that there are no repeats for any of the steps, the orchestration layer will update the datastore to indicate that the record has been completed (or that no additional work needs to be done on the record).

In some embodiments, the order of the steps in the pipeline can facilitate efficiency of the pipeline. For example, in a step of a pipeline images are filtered for content, and if the images contain unsuitable content, e.g., financing terms, the images are blacklisted. In another step, the images are resized. In this example, the filtering step can take place before the resizing step. This is because the filtering can eliminate some of the images for resizing, but if an image is resized and then eliminated, the resizing effort is wasted. Hence, the overall efficiency of the pipeline can be enhanced.

Pipeline Steps

FIG. 1 shows a pipeline 100 for processing images according to an example embodiment. The pipeline 100 can include an orchestration layer 101, a plurality of clusters 110, a plurality of queues 120, and a datastore 140. The pipeline 100 can also be connected to an upstream process 150. In this example embodiment, the pipeline 100 can process certain images relating to car listings. Specifically, the pipeline 100 can receive various records from car dealers. Each record can include a unique identification number, vehicle information and at least one image URL. The pipeline can download, filter and resize the images associated with the record and store them on a datastore 150. The processed images can be used by a website to display aggregated vehicle listings. The website can, for example, enable the users to search for cars using make and model. Each listing can include a few images of a vehicle listed for sale, and the pipeline 100 can provide the image inventory for this website.

A car dealer can transmit a record to an upstream process 150. The orchestration layer 101 can receive the record from the upstream process 150. Each record can include one or more URLs for the images of the car listings. An orchestrator (or worker) of the orchestration layer 101 can pick up the record and publish the record on a queue (if the record does not indicate otherwise). The queue on which the orchestrator publishes the record determines what task or step will be performed. For example, if the orchestrator publishes the record on a queue 121 associated with a downloading cluster 111 (i.e., the queue where the downloading workers of the downloading cluster listen to), a downloading worker (or downloader) will pick up the record and download the images identified in the record. Specifically, the downloader will visit the URLs identified in the record and download the images from the destinations identified by the URLs. The images can be stored in the datastore 140. Once the images are downloaded by the downloader, the downloading step is completed, and the downloader can publish the record to a completion queue 122. As another example, the downloader can send a message to the completion queue 122. The message can include the record and indicate which images were downloaded (and if there were any failures). The message can also contain the original addresses of the images, the images' current locations in the datastore, the hash of the record (based on the image addresses), and the status of each image. The orchestrator can update the message for the next step based on this information. If the message indicates that downloading all images failed, then the orchestrator can end the processing of the record.

The orchestrator of the orchestration layer 101 knows the completion queue 122 for the downloading cluster 111 and the orchestrator listens to this location. Once published on the completion queue 122, the orchestrator picks up the record (or message). The orchestrator determines if the downloader was successful in downloading the images. This determination can be made by evaluating the message that the downloader sent to queue 122. The message can include successfully downloaded images, and any failed ones along with their reason (e.g., to determine if it's a recoverable failure).

If the downloader was successful, the orchestrator will publish a message including the record and addresses of the downloaded images to the next queue. In this case, the next queue can be a queue 123 for filtering. If the downloader was not successful, the orchestrator can mark the record as a failure. The orchestrator can also update the metadata associated with the record or images in the datastore 140.

In an example embodiment, the step that follows downloading is the filtering step. In the filtering step, the filtering cluster 112 determines if any of the downloaded images contain an impermissible word or text. In this step, a worker of the filtering cluster 112 performs an optical character recognition. If the worker does not detect any impermissible words in the image, the image will be marked as approved. Otherwise, the image will be marked as blocked. At the end of this step, the worker will return a list of approved images and a list of blocked images to a completion queue 124 for the filtering cluster. Specifically, the filtering worker can publish a message on the completion queue 124. This message can contain two new fields: retained and removed. These fields are the image addresses that were either retained or removed in the filtering step. The orchestration layer marks the removed images as unsuitable in datastore 140.

The orchestrator may be listening to the queue 124 and may immediately blacklist the blocked images. The images that were identified as approved, can be move onto the next step. In this example embodiment, the next step can be resizing the images. The pipeline can resize the images to ensure that all the images have the same size so that they appear uniform on the website. Thus, after the filtering step, the orchestrator can publish a message on the resizing queue 125. This message can include the images that were approved.

The resizing cluster 113 can include one or more workers (or resizers). A resizer can pick up the record from the queue 125, and the resizer can resize the images to conform each image to a predetermined configuration. The configuration can be determined by the orchestration layer 101. The orchestration layer 101 can include a configuration which determines the image sizes. The resizers will then resize the images to the sizes specified by the orchestration layer. Once completed, the resizers publish the images to a completion queue 126 associated with the resizers.

The orchestrator will then pick up the resized images. If the record (or message) indicates that the images were resized successfully and every step was performed successfully, the orchestrator will mark the record as ready and active in the datastore. The images that made it through the pipeline will be available for consumption on the website.

In an example embodiment, the pipeline can include an optional object recognition step. The object recognition step can be performed by an object recognition cluster which can include one or more workers. One of the workers can detect one or more objects in each image. This can be helpful with ranking the images based on relevance. For example, for a car sale website, each listing can include one or more images of a car. The worker can identify the objects displayed in each image and determine whether the image displays the front of the vehicle, the back of the vehicle, the side of the vehicle, etc. The worker can also determine whether the image is what the record claims to be, e.g., a 2019 Chevrolet Silverado. In other words, the worker can determine the concept of each image. The object recognition step can be a separate step from the filtering (or OCR) step.

In some applications, downstream processes can be interested in knowing the status of the record. In an example embodiment, the orchestration layer can proactively report to a downstream process the status of the record or certain data about the record. This can be helpful for metric reporting or logging. For example, an application or model can be interested in knowing the average number of images that come with car listings. The orchestration layer of the pipeline can report a steady stream of data to the model. This reporting does not impact the outcome of the pipeline (i.e., the images), but it can improve performance of other models or systems. As another example, other than the website, there can be another application that consumes these images. Instead of continuously checking for the images, this application can be interested in knowing when a particular set of images are processed. The orchestration layer can report or publish completion of certain steps to this application, e.g., the new images are processed.

Computer Clusters Performing the Pipeline Steps

A computer cluster can be a set of connected computers that work together so that they can be viewed as a single system. In an example embodiment, each one of the steps of the pipeline can be performed by a computer cluster. For example, there can be a downloading cluster, which can include a plurality of downloaders (or workers); a filtering cluster, which can include a plurality of filterers (or workers); and a resizing cluster, which can include a plurality of resizers (or workers).

Each one of the clusters of the pipeline can dynamically scale based on a determination made by the cluster. If a cluster of the pipeline slows down, the cluster can scale up to meet the demand. Additionally, if any cluster of the pipeline has too many resources available at its disposal, it can scale down to reduce cost. The scaling can be performed based on the overall resource requirements of the individual clusters. The clusters can scale based on available messages, the number of messages in the queues. If messages build up too fast, then more services are deployed which can result in the cluster scaling up. The scaling can also be performed based on a predefined resource availability, e.g., the cluster can scale to meet a predefined upper or lower limit. The orchestrator does not need to instruct the clusters to scale up or down. The scaling event happens independently and without any intervention by the orchestration layer.

For example, as the orchestration layer publishes requests to a queue, the individual cluster associated with the queue can scale based on the number of events coming into the queue. The individual cluster can determine whether it can keep up with the level of work it is receiving and it will scale out if it cannot keep up. As another example, as records are published on a downloading queue, the downloading cluster can fail to meet the demand in a timely fashion, as defined by the cluster. Therefore, this can trigger a scaling event. As yet another example, if there are too many resources available in a cluster for the number of incoming events, the cluster can scale back.

The orchestration layer is ignorant of the scaling events. In fact, one of the benefits of the pipeline of this disclosure is that the orchestration layer does not need to have any knowledge about the structure of the individual clusters. Knowledge about each cluster's structure is complexity which does not benefit the orchestration layer itself. Specifically, for the orchestration layer to be informed about the structure of the clusters, the orchestration layer has to keep track of the details about the clusters, e.g., the components of each cluster, how many there are, their respective purposes and implementations, etc. This would mean that either the orchestration layer will have to keep track of these details, or some outside entity will have to keep track of them. This makes the pipeline prone to failure. For example, unless there is an observer of the whole pipeline, if a computer is added somewhere without the knowledge of the orchestration layer, the orchestration layer and the pipeline can fail. Additionally, none of the clusters need to know about one another, their respective structures, or the orchestration layer. Neither do the clusters need to know their respective positions in the pipeline relative to other clusters. All the clusters are agnostic of each other. Only the orchestration layer knows the layout of the full pipeline.

Downloading

In an example embodiment, a pipeline can include a downloading step, which can include receiving data from a remote system, such as a server. The server can be a web server, an FTP server, an email server, or other similar systems. For downloading, the standard HTTP protocols or a proxy can be used.

Filtering

In an example embodiment, a pipeline can include a filtering step. The filtering step can include performing an optical character recognition ("OCR") algorithm and comparing the recognized text to a list of blocked words. If an image contains any of the blocked words, the image will be blacklisted. For example, a financing company might be interested in removing images with finance information on them. Hence, such images can be blocked in this step.

In the OCR part of the algorithm, a filtering worker can determine if there is any text in the image. The worker can use a machine learning model for this purpose. The model can be trained on text. If the worker discovers any text in the image, the worker will draw a bounding box around that text. The next phase for the worker is to identify the characters in each bounding box. Once the text is extracted, the worker can compare the extracted text to the list of blocked words. If the text includes any of those words, e.g., words that the website operator would not want to display on the website, the image can be blacklisted. For a blacklisted image, the orchestration layer will not store the image in the datastore. Also, the orchestration layer will skip all the following steps for that image. The orchestrator can also skip any repeat steps that maybe included in the image's record. Once an image has been blacklisted, it will not be retried again unless it is forced to by the upstream process.

Resizing

In an example embodiment, a pipeline can include a resizing step. The record published on the resizing queue can include a location of the image, and further state a size for the image. The resizing worker can resize the image to the stated size. In an example embodiment, the resizing worker can maintain an aspect ratio of the image to ensure that the image is not distorted. The record (or the orchestration layer) can specify the aspect ratio of the image.

In an example embodiment, the resizing step can include cropping the images. The images can be cropped to fit the required aspect ratio which makes all of the images uniform in their dimensions. If by maintaining the aspect ratio of an image, the image does not fit into the size specified for the image, the resizing worker can crop the image. If an image's native aspect ratio does not require cropping, then cropping will not be performed.

Object Orientation Detection

In an example embodiment, the pipeline can include an object recognition step. The object recognition step can come after one or more of the downloading, filtering and resizing steps. In this step, a worker can determine at least one main object included in the images. The worker can scan all the images associated with the record and by determining the objects shared in the images, the worker can determine the main object. The worker can further determine an orientation of the object in each image. For example, the worker can determine whether the front of the main object is displayed or the back of the main object is displayed. Based on this determination, the worker can rank the images. For example, the worker can rank the images that display the front of the main object higher than the images that display the back of the main object. Once the worker finishes ranking the images, the worker can publish a message on the completion queue associated with the object recognition cluster. The message can include the record and the ranking of the images. The orchestration layer can be listening to the queue and upon receiving the message, the orchestration layer can move the record along the pipeline. The orchestration layer can also update the meta data associated with the record in the datastore.

The object recognition algorithm can use a machine learning model. The model can be trained on known images. Additionally, pattern training can be implemented for the model.

Virus Scanning

In an example embodiment, the pipeline can include a virus scanning step. The virus scanning step can follow the downloading step. If an image is identified as virus, the image may immediately be discarded, and all of the steps that were going to follow the virus scanning step can be skipped. Additionally, all the repeat steps can be skipped.

Cloud Implementation

In an example embodiment, each cluster can include one or more containers implemented in a cloud computing architecture. A container can be a computer program that performs operating-system-level virtualization. Containers can be isolated from each other and bundle their own tools, libraries and configuration files. Containers can communicate with each other through well-defined channels. Containers can be created from images that specify their precise contents.

Inside each one of the containers in the pipeline, there can be an application running. The application can be an application which can best run the container for its intended purpose, e.g., downloading, filtering, resizing, etc. For example, for an orchestrator, the application can be a Java application. As another example, the filtering application can be a python implementation running.

The individual clusters in a pipeline can be separate in that if one of the clusters is crashed, the other cluster can be available and functional. For example, if every single orchestration container crashed, the filtering cluster can still function, along with the downloader and resizer clusters.

The pipeline of this disclosure can be recoverable, which means that if a consumer (e.g., orchestrator or worker) of a message fails, the message can still be processed. The messaging system of the pipeline is based on queuing technology, which requires a consumer to acknowledge the message before the message is removed from the queue. If the consumer fails to process a message or fails for any reasons, it does not acknowledge the message. Thus, the message can go back to the queue allowing another consumer to read and process it. Because the messages are published, the orchestration layer can ascertain where the work was left off and the orchestration layer can pick up the work from it was left. Before the pipeline of this disclosure, traditional systems directly exchanged messages and information. However, in these systems, if one cluster crashed, all the data would have been lost.

For example, if a downloader crashes in the middle of processing a message, the work is effectively lost. Because the downloader did not acknowledge the message, another downloader can start processing the message again. This can entail re-downloading any images that may or may not have been downloaded by the previous downloader. However, if the downloader publishes a message to the completion queue and crashes after that, the message can contain the current address locations of the images downloaded. Hence, the orchestration layer can push the record to the next steps in the pipeline.

Figure 2:
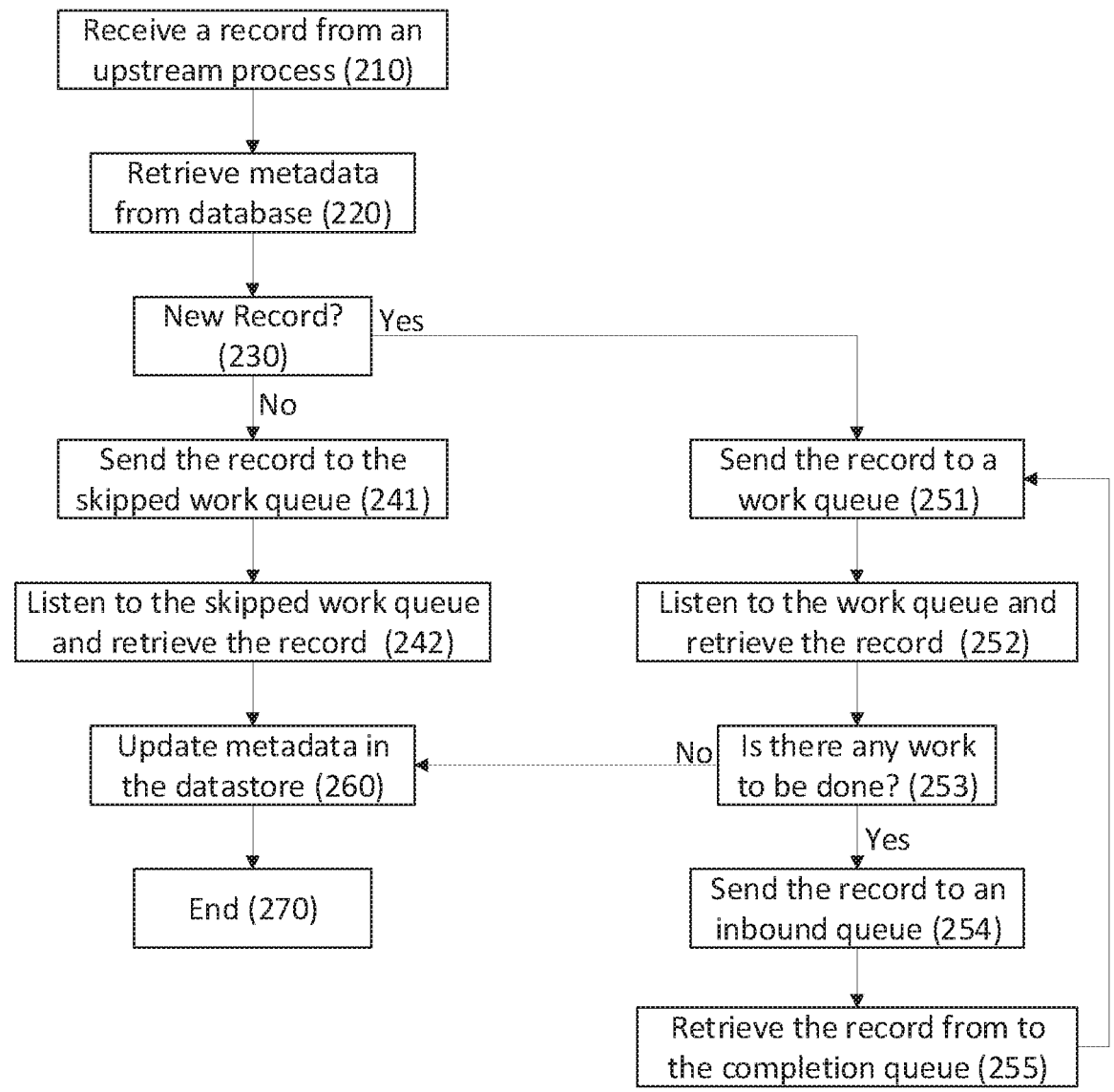
FIG. 2 shows a process flow of a pipeline according to an example embodiment.

FIG. 2 shows a process flow of a pipeline according to an example embodiment. In this example process flow, in step 210, an orchestration layer of a pipeline can receive a record from an upstream process. In step 220, the orchestration layer can search for and retrieve metadata associated with the record from a datastore. If the record is a new record, it is possible that there is no metadata associated with the record in the datastore. However, for other records, there can be metadata associated with the record in the datastore. In step 230, the orchestration layer can determine whether the record is a new record. This determination can be made based on the metadata retrieved from the datastore. If the record is a new record, the process can continue to step 251 and if the record is not a new record, the process can continue to step 241.

In step 251, which can be an optional step, the orchestration layer can publish the record to a work queue. In step 252, the orchestration layer can listen to the work queue and retrieve the record. In step 253, the orchestration layer can determine whether any work needs to be done on the record. If work needs to be done on the record, in step 254, the orchestration layer can publish the record to an inbound queue of a cluster, e.g., a downloading cluster. In step 255, the orchestration layer can listen to a completion queue of the cluster, and retrieve the record if the cluster has finished work on the record. Subsequently, the process can return to step 251, where the orchestration layer can publish the record to the work queue. This process can continue so long as work needs to be done on the record. Once no additional work needs to be done on the record, the process can continue to step 260, where the orchestration layer updates the metadata associated with the record in the datastore, and the process can end in step 270.

If the record has been processed by the orchestration layer before, the process can continue to step 241, where the orchestration layer publishes the record to the skipped work queue. The orchestration layer can listen to this queue in step 242 and retrieve the record. Subsequently, in step 260 the orchestration layer can update the metadata in the datastore, and in step 270, the process can end.

Technical Implementation of a Server

Figure 3:
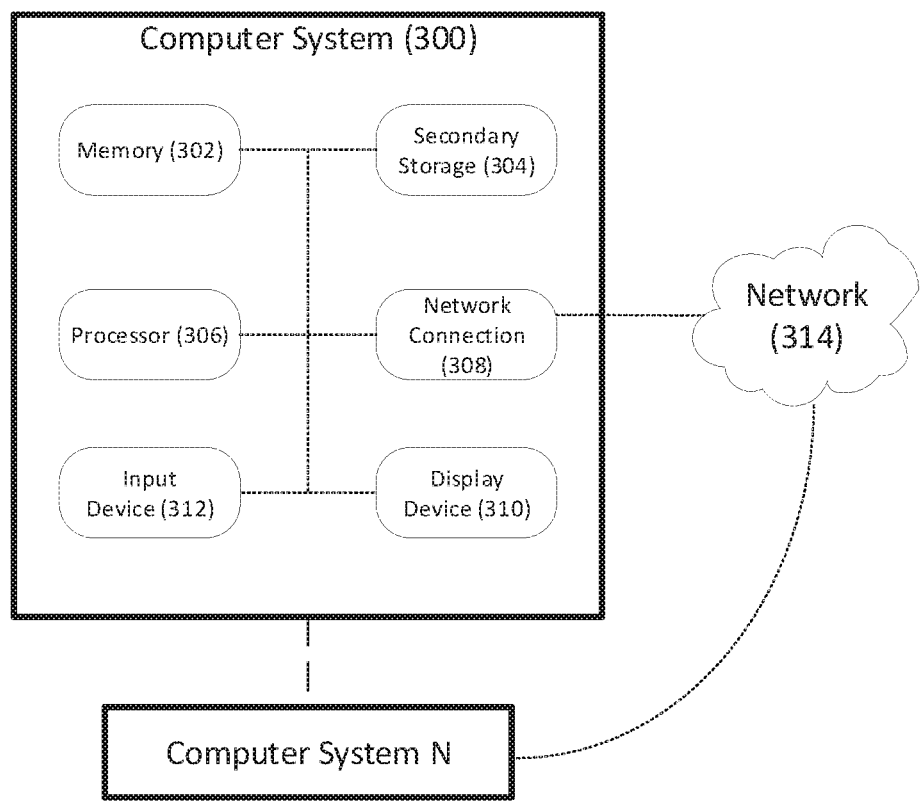
FIG. 3 illustrates exemplary hardware components for a server.

FIG. 3 illustrates exemplary hardware components of a server. A computer system 300, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 300, may run an application (or software) and perform the steps and functionalities described above. Computer system 300 may connect to a network 314, e.g., Internet, or other network, to receive inquires, obtain data, and transmit information and incentives as described above.

The computer system 300 typically includes a memory 302, a secondary storage device 304, and a processor 306. The computer system 300 may also include a plurality of processors 306 and be configured as a plurality of, e.g., bladed servers, or other known server configurations. The computer system 300 may also include a network connection device 308, a display device 310, and an input device 312.

The memory 302 may include RAM or similar types of memory, and it may store one or more applications for execution by processor 306. Secondary storage device 304 may include a hard disk drive, floppy disk drive, CD-ROM drive, or other types of non-volatile data storage. Processor 306 executes the application(s), such as those described herein, which are stored in memory 302 or secondary storage 304, or received from the Internet or other network 314. The processing by processor 306 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 300 may store one or more database structures in the secondary storage 304, for example, for storing and maintaining the information necessary to perform the above-described functions. Alternatively, such information may be in storage devices separate from these components.

Also, as noted, processor 306 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 300.

The input device 312 may include any device for entering information into the computer system 300, such as a touch-screen, keyboard, mouse, cursor-control device, microphone, digital camera, video recorder or camcorder. The input and output device 312 may be used to enter information into GUIs during performance of the methods described above. The display device 310 may include any type of device for presenting visual information such as, for example, a computer monitor or flat-screen display (or mobile device screen). The display device 310 may display the GUIs and/or output from sub-system components (or software).

Examples of the computer system 300 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 300 is shown in detail, system 300 may use multiple computer systems or servers as necessary or desired to support the users and may also use back-up or redundant servers to prevent network downtime in the event of a failure of a particular server. In addition, although computer system 300 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 300, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A system including a pipeline for processing images, the system comprising:
   an orchestration layer;
   a plurality of clusters, each cluster being in communication with an incoming queue and an outgoing queue; and
   a data store;
   wherein the orchestration layer is configured to:
      receive a record including metadata associated with an image from an upstream process, wherein the metadata includes a hash of the image;
      store the record including the metadata in the data store;
      search the data store for records including same hash, and in response to retrieving a stored record including the same hash, overrule an intrinsic policy of the pipeline based on the metadata of the stored record;
      publish the record to an incoming queue of a cluster, the cluster being chosen based on the intrinsic policy of the pipeline; and
      retrieve the record from an outgoing queue of the cluster when the cluster finishes a task associated with the record;

wherein the plurality of clusters include:
- a downloading cluster for downloading the image from a third-party source and storing the image in the data store;
- a filtering cluster for determining a content of the image and blocking the image based on the content of the image; and
- a resizing cluster for conforming a size of the image to a predetermine size.

2. The system of claim 1, wherein orchestration layer publishes the record to the incoming queue of the cluster by sending a message to the queue.

3. The system of claim 2, wherein message includes an original address of the image, the image's current location in the data store, the hash of the record, or the status of the image.

4. The system of claim 1, further comprising the upstream process, wherein the upstream process is configured to:
- receive a plurality of records from a plurality of third-party sources; and
- reformat the plurality of records into a format acceptable by the orchestration layer.

5. The system of claim 1, wherein the metadata further includes:
- a unique identifier;
- a status of the image;
- a timestamp; or
- an identity of a provider of the record.

6. The system of claim 5, wherein the status of the image indicates which one of the plurality of clusters have processed the image.

7. The system of claim 5, wherein the status of the image indicates which of the plurality of clusters have accessed the image or when the image was last modified.

8. The system of claim 1, wherein the metadata of the image includes an instruction to overrule the intrinsic policy.

9. The system of claim 1, wherein the intrinsic policy includes a set of rules for defining an order of the plurality of clusters for processing the images.

10. The system of claim 9, wherein the intrinsic policy can be changed by an administrator of the system to change the order of the plurality of clusters processing the images.

11. The system of claim 9, wherein the order of the plurality of clusters includes the filtering cluster before the resizing cluster.

12. The system of claim 1, wherein the filtering cluster is configured to:
- perform an OCR algorithm to determine the content of the image; and
- block the image if the image contains at least one blocking word.

13. The system of claim 1, further comprising an object recognition cluster configured to:
- detect at least one object in the image;
- determine whether the at least one object is identified in the record; and
- rank the record based on the determination of whether the object is identified in the record.

14. The system of claim 13, wherein the object recognition cluster is further configured to:
- determine an orientation of the at least one object in the image; and
- rank the record based on the orientation of the at least one object in the image.

15. The system of claim 1, wherein the orchestration layer is configured to transmit a report to a downstream process, the report including at least some of the metadata included in the record.

16. The system of claim 1, wherein each cluster in the plurality of clusters includes a set of connected computers that work together and are configured to dynamically scale based on a number of records published to an incoming queue of the cluster.

17. The system of claim 16, wherein the orchestration layer is unaware of the scaling in the cluster.

18. The system of claim 1, wherein the downloading cluster uses an HTTP protocol for downloading the image.

19. The system of claim 1, wherein the resizing cluster is configured to resize an image while maintaining a ratio of the image.

20. The system of claim 1, further comprising a virus detection cluster for scanning each record or image associated with each respective record.

* * * * *